(12) United States Patent
Barenys et al.

(10) Patent No.: US 6,769,078 B2
(45) Date of Patent: Jul. 27, 2004

(54) METHOD FOR ISOLATING AN I2C BUS FAULT USING SELF BUS SWITCHING DEVICE

(75) Inventors: Michael Anton Barenys, Austin, TX (US); Robert Allan Faust, Austin, TX (US); Joel Gerald Goodwin, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 562 days.

(21) Appl. No.: 09/779,368

(22) Filed: Feb. 8, 2001

(65) Prior Publication Data

US 2002/0108076 A1 Aug. 8, 2002

(51) Int. Cl.[7] ............................................... G06F 11/00
(52) U.S. Cl. ........................... 714/43; 714/56; 710/109
(58) Field of Search ............................. 714/56, 43, 44, 714/30; 710/15, 109

(56) References Cited

U.S. PATENT DOCUMENTS

| | | | | | |
|---|---|---|---|---|---|
| 5,500,945 | A | * | 3/1996 | Maeda et al. .................. | 714/56 |
| 5,991,900 | A | * | 11/1999 | Garnett ......................... | 714/56 |
| 6,032,271 | A | * | 2/2000 | Goodrum et al. ............. | 714/56 |
| 6,105,146 | A | * | 8/2000 | Tavallaei et al. ............... | 714/2 |
| 6,128,682 | A | * | 10/2000 | Humpherys et al. .......... | 710/301 |
| 6,311,296 | B1 | * | 10/2001 | Congdon ....................... | 714/56 |
| 6,324,596 | B1 | * | 11/2001 | Houg ............................. | 710/19 |
| 6,590,755 | B1 | * | 7/2003 | Behr et al. ..................... | 361/62 |

\* cited by examiner

Primary Examiner—Robert Beausoliel
Assistant Examiner—Christopher McCarthy
(74) Attorney, Agent, or Firm—Duke W. Yee; Mark E. McBurney; Lisa L. B. Yociss (57) ABSTRACT

A method system, and computer program product for determining the source of a fault within a bus, such as, for example, an inter integrated circuit (I2C) bus is provided. In one embodiment, a bus driver monitors the bus for faults. If a fault occurs on the bus, the bus driver resets each switch on the bus and then turns on the first switch connected to the bus driver. If the fault is encountered after turning on the first switch, then it is determined that the fault was caused by either the first switch, a device connected to the bus as a result of turning on the first switch, or one of the bus connectors just switched on as a result of turning on the first switch. If the fault is not encountered, the next switch is turned on and the process is repeated until the fault is encountered. The fault when encountered will be caused by either the most recently turned on switch or a device or bus connectors switched in by the turning on of the last switch. Thus, the fault can be isolated to a few devices, switches, or bus connections rather than the large number of potential devices, switches, or bus connections that could have potentially caused the fault.

24 Claims, 3 Drawing Sheets

I²C BIRDIRECTIONAL BUS SWITCH MODULE 400

FIG. 5

METHOD FOR ISOLATING AN I2C BUS FAULT USING SELF BUS SWITCHING DEVICE

CROSS REFERENCE TO RELATED APPLICATIONS

The present application is related to co-pending U.S. patent application Ser. No. 09/779,364 entitled "I2C SELF BUS SWITCHING DEVICE" filed Feb. 8, 2001 and to U.S. patent application Ser. No. 09/773,185 entitled "Dynamically Allocating I2C Addresses Using Self Bus Switching Device" filed Jan. 31, 2001. The content of the above mentioned commonly assigned, co-pending U.S. Patent applications are hereby incorporated herein by reference for all purposes.

BACKGROUND OF THE INVENTION

1. Technical Field

The present invention relates to computer bus architecture. More specifically, the present invention relates to Inter Integrated Circuit ($I^2C$) buses.

2. Description of Related Art

Many similarities exist between seemingly unrelated designs in consumer, industrial and telecommunication electronics. Examples of similarities include intelligent control, general-purpose circuits (i.e. LCD drivers, I/O ports, RAM) and application-oriented circuits. The Philips Inter Integrated Circuit ($I^2C$) bus is a bi-directional two-wire serial bus designed to exploit these similarities.

Devices on the $I^2C$ bus are accessed by individual addresses, 00-FF (even addresses for Writes, odd addresses for reads). The $I^2C$ architecture can be used for a variety of functions. One example is Vital Product Data (VPD). Each component in the system contains a small Electrically Erasable Programmable Read Only Memory (EEPROM) (typically 256 bytes) which contains the VPD information such as serial numbers, part numbers, and EC revision level.

$I^2C$ busses can connect a number of devices simultaneously to the same pair of bus wires. However, a problem results when one of the devices malfunctions and pulls a bus signal (clock or data) low the bus will not operate and it is very difficult to determine which of the numerous devices connected to the $I^2C$ bus is responsible. A similar problem occurs when one of the bus conductors becomes shorted to a low impedance source, such as, for example, ground.

Therefore, an method, computer program product, system, and improved $I^2C$ bus for isolating the device that has malfunctioned resulting in the bus ceasing to operate would be desirable.

SUMMARY OF THE INVENTION

The present invention provides a method, system and computer program product for determining the source of a fault within a bus, such as, for example, an inter integrated circuit (I2C) bus. In one embodiment a bus driver monitors the bus for faults. If a fault occurs on the bus, the bus driver resets each switch on the bus and then turns on the first switch connected to the bus driver. If the fault is encountered after turning on the first switch, then it is determined that the fault was caused by either the first switch, a device connected to the bus as a result of turning on the first switch, or one of the bus connectors just switched on as a result of turning on the first switch. If the fault is not encountered, the next switch is turned on and the process is repeated until the fault is encountered. The fault when encountered will be caused by either the most recently turned on switch or a device or bus connectors switched in by the turning on of the last switch. Thus, the fault can be isolated to a few devices, switches, or bus connections rather than the large number of potential devices, switches, or bus connections that could have potential caused the fault.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
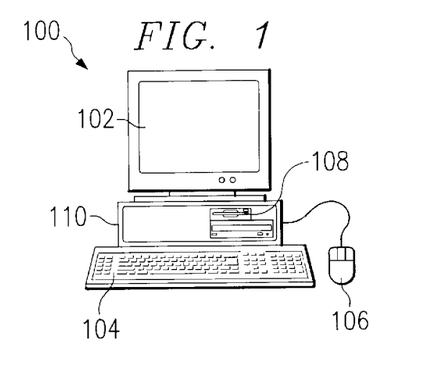
FIG. 1 depicts a pictorial representation of a data processing system in which the present invention may be implemented.

With reference now to the figures and in particular with reference to FIG. 1, a pictorial representation of a data processing system in which the present invention may be implemented is depicted in accordance with a preferred embodiment of the present invention. A computer 100 is depicted which includes a system unit 110, a video display terminal 102, a keyboard 104, storage devices 108, which may include floppy drives and other types of permanent and removable storage media, and mouse 106. Additional input devices may be included with personal computer 100, such as, for example, a joystick, touchpad, touch screen, trackball, microphone, and the like. Computer 100 can be implemented using any suitable computer, such as an IBM RS/6000 computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface that may be implemented by means of systems software residing in computer readable media in operation within computer 100.

Figure 2:
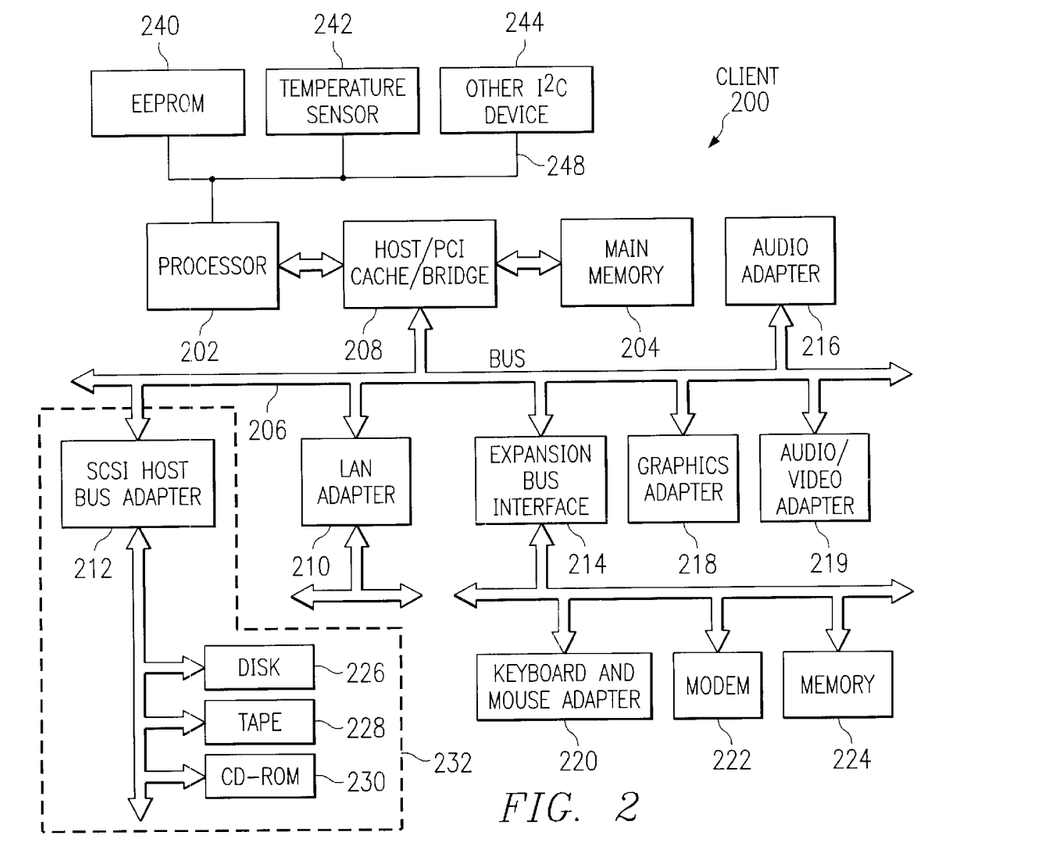
FIG. 2 depicts a block diagram of a data processing system in which the present invention may be implemented.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. Data processing system 200 employs an $I^2C$ bus architecture. The $I^2C$ bus 248 is a bi-directional serial bus requiring only two wires: a serial data line (SDA) and a serial clock line (SCL). Although serial buses do not have the throughput capability of parallel buses, serial buses require less wiring and fewer Integrated Circuit (IC) connector pins. Each device (processor 202, electronically erasable and programmable read only memory (EEPROM) 240, temperature sensor 242, and any other I$^2$C device 244) connected to I$^2$C bus 248 is software addressable by a unique address. The devices can operate as either transmitters or receivers. All I$^2$C bus compatible devices have an on-chip interface which allows the devices to communicate directly with each other via the I$^2$C bus 248. A simple master/slave relationship exists at all times. A master is a device which initiates a data transfer and the clock signals to permit the transfer, and any device addressed at the time of transfer is considered a slave. The I$^2$C bus is a multimaster bus, meaning more than one device capable of controlling the bus can be connected to it. However, the present implementation is operated in a single-master mode. Typical I$^2$C local bus implementations will support three or four I$^2$C expansion slots or add-in connectors.

Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards. In the depicted example, local area network (LAN) adapter 210, small computer system interface SCSI host bus adapter 212, and expansion bus interface 214 are connected to local bus 206 by direct component connection. In contrast, audio adapter 216, graphics adapter 218, and audio/video adapter 219 are connected to local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230.

An operating system runs on processor 202 and is used to coordinate and provide control of various components within data processing system 200 in FIG. 2. The operating system may be a commercially available operating system such as Windows 2000, which is available from Microsoft Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented programming system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash ROM (or equivalent nonvolatile memory) or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230, as noted by dotted line 232 in FIG. 2 denoting optional inclusion. In that case, the computer, to be properly called a client computer, must include some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a personal digital assistant (PDA), which is configured with ROM and/or flash ROM to provide non-volatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance. The processes of the present invention are performed by processor 202 using computer implemented instructions, which may be located in a memory such as, for example, main memory 204, memory 224, or in one or more peripheral devices 226–230.

I$^2$C buses can connect a number of devices simultaneously to the same pair of bus wires. However, a problem results when one of the devices malfunctions and pulls a bus signal (clock or data) low. The I$^2$C bus will not operate in this situation, and it is difficult to determine which device is causing the problem. A similar problem occurs when one of the I$^2$C bus conductors becomes shorted to a low impedance source, such as ground. The solution to these problems is to break the bus into sections in order to determine which section contains the fault. This can be accomplished with the 120 self bus switching device.

The I$^2$C self bus switching device monitors the I$^2$C bus and responds to its own address. The device also passes bus signals through if its switches are turned on. "On" means that the circuit is closed (i.e. the devices downstream from the switch will be connected to the bus and can see the bus traffic). When the switch is "off", the downstream devices are disconnected from the bus. The device can be commanded to turn its switches on or off, and the switches can also be turned off independent of the I$^2$C bus by the switch reset signal. An eight-pin package, for example, permits one address bit to be programmed. This allows switch devices to deal with a bus that has a forked path. A larger pin package can have more address options.

Figure 3:
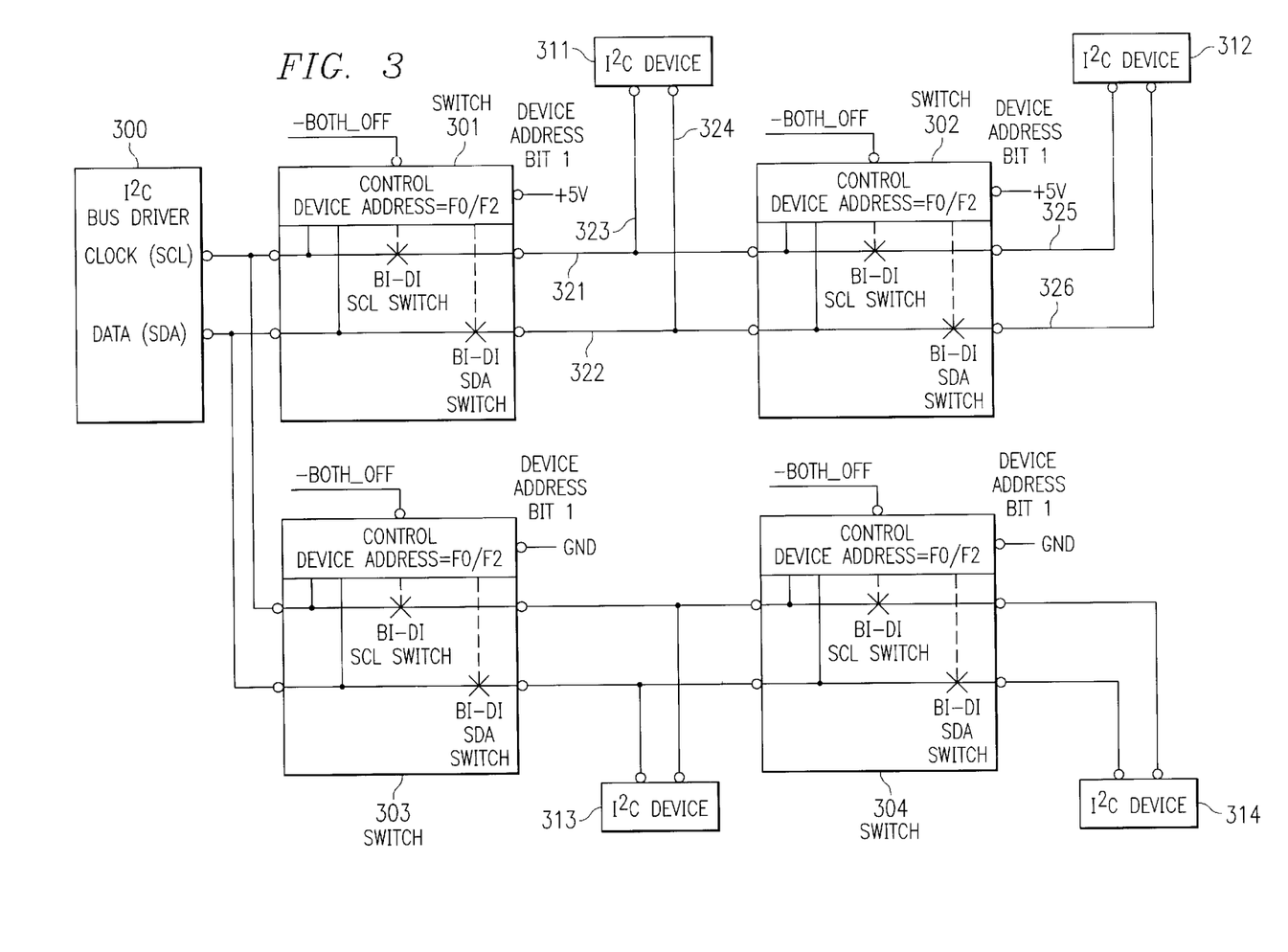
FIG. 3 depicts a schematic diagram illustrating a $I^2C$ self bus switching device in accordance with the present invention.

Referring now to FIG. 3, a schematic diagram illustrating a I$^2$C self bus switching device is depicted in accordance with the present invention. I$^2$C bus 390 may be implemented as, for example, I$^2$C bus 248 in FIG. 2. The bus driver 300 can communicate with the four main devices 311–314, plus switches 301–304. If a fault occurs on the I$^2$C bus, the system will assert a signal to reset all of the switches 301–304. The bus master will send a bus command on a predefined address to indicate that switch 301 should turn on. Since only switch 301 can see this command (switch 302 is disconnected), switch 301 operates but switch 302 does not, since the off condition of switch 301 prevented switch 302 from seeing the command. This switch-on command connects the device 311 and switch 302 to the bus. If a fault now exists, it is located in device 311, switch 302, or on the bus connectors 321–324 just switched on.

If no fault exists, the bus master can once again send a command to the predefined address. Both switches 301 and 302 will see this command, but switch 301 will not change its switch status since it is already on. Switch 302 will respond to the command, and will then connect device 312 to the bus. If a fault occurs, it is located in device 312 or on the bus connectors 325 and 326. This process is continued with the switches 303 and 304 and devices 313 and 314. In this example, switches 301 and 303 are connected in parallel, but switch 303 has an address bit pulled down, which makes its predefined address different from that of switch 301.

Although the switches have been described herein as either separate chips or incorporated into the I2C bus itself, the switches could also be incorporated into one of the devices connected to the I2C bus. Furthermore, the switch could be incorporated into an existing switch on an I2C device with separate signals to indicate which switching function that the switch should perform. Thus, the present invention is not limited to the specific embodiment described herein.

Figure 4:
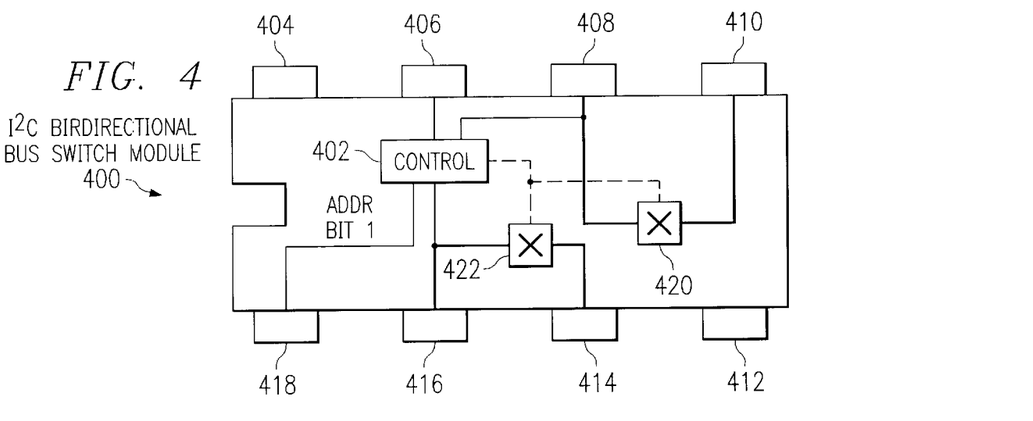
FIG. 4 depicts a block diagram of an $I^2C$ bi-directional bus switch module in accordance with the present invention.

With reference now to FIG. 4, a block diagram of an I²C bi-directional bus switch module is depicted in accordance with the present invention. I²C bi-directional bus switch module 400 may be implemented as, for example, any of switches 301–304 in FIG. 3. In the depicted example, switch module 400 is an eight pin 404–418 package that includes control unit 402 and switches 420–422. For clarity, not all connections, such as power connections, within switch module 400 are shown.

Pin 404 is a voltage input pin connected, in one embodiment, to a 5 volt power source. Pin 412 is connected to ground. Control unit 402 will respond to a predefined address, one bit of which is determined by pin 418 being pulled high or low. Thus, the bus driver may direct certain data or instructions to a particular switch module.

Pin 416 receives clock signals from a bus driver and passes these signals to control unit 402 as well as to clock signal switch 422. Clock signal switch 422 can be closed or opened by control unit 402 as directed by a bus driver. If clock signal switch 422 is open, any clock signals received via pin 416 are prevented from being sent to downstream switch modules or devices. If clock signal switch 422 is closed, then any clock signal received via pin 416 is still received by control unit 402 but in addition, the signal is passed downstream to other switch modules and/or devices via pin 414. Clock signal switch 422 may also receive signals from pin 414 which may be passed to control unit 402 as well as upstream to other switch modules, devices, and/or the bus driver via pin 416 if clock signal switch 422 is closed and are prevented from being passed upstream if clock signal switch 422 is open.

Pin 408 receives data signals from a bus driver and passes these data signals to both the control unit 402 and data signal switch 420. If control unit 402 has been instructed by the bus driver to close data signal switch 420, then data signals received via pin 408 are still received by control unit 402 but in addition, the signals are passed downstream to other switch modules and/or devices by data signal switch 420 via pin 410. If control unit 402 has been instructed by the bus driver to open data signal switch 420, then data signals received via pin 408 are prevented from being passed downstream by data signal switch 420. Similarly, any data signals received from downstream by data signal switch 420 via pin 410 are passed or prevented from being passed upstream to other switch modules, devices, and/or the bus driver depending on whether data signal switch 420 has been closed or opened by control unit 402.

Switch module 400 also includes a pin 406 which receives switch reset signals from the bus driver and passes these signals to control unit 402. If a switch reset signal is received by control unit 402, both switches 420–422 are opened. By doing this, the bus driver can reset all switch modules at once in response to a malfunctioning device or switch module that has caused the I²C bus cease functioning properly and then determine which of the devices has caused the problem by selectively turning on switch modules until the malfunctioning device or switch is found.

The bi-directional bus switch module depicted herein is given merely by way of example and is not intended as an architectural limitation to the present invention. Other embodiments of a bus switch may include different numbers of pins and include other components not shown.

Figure 5:
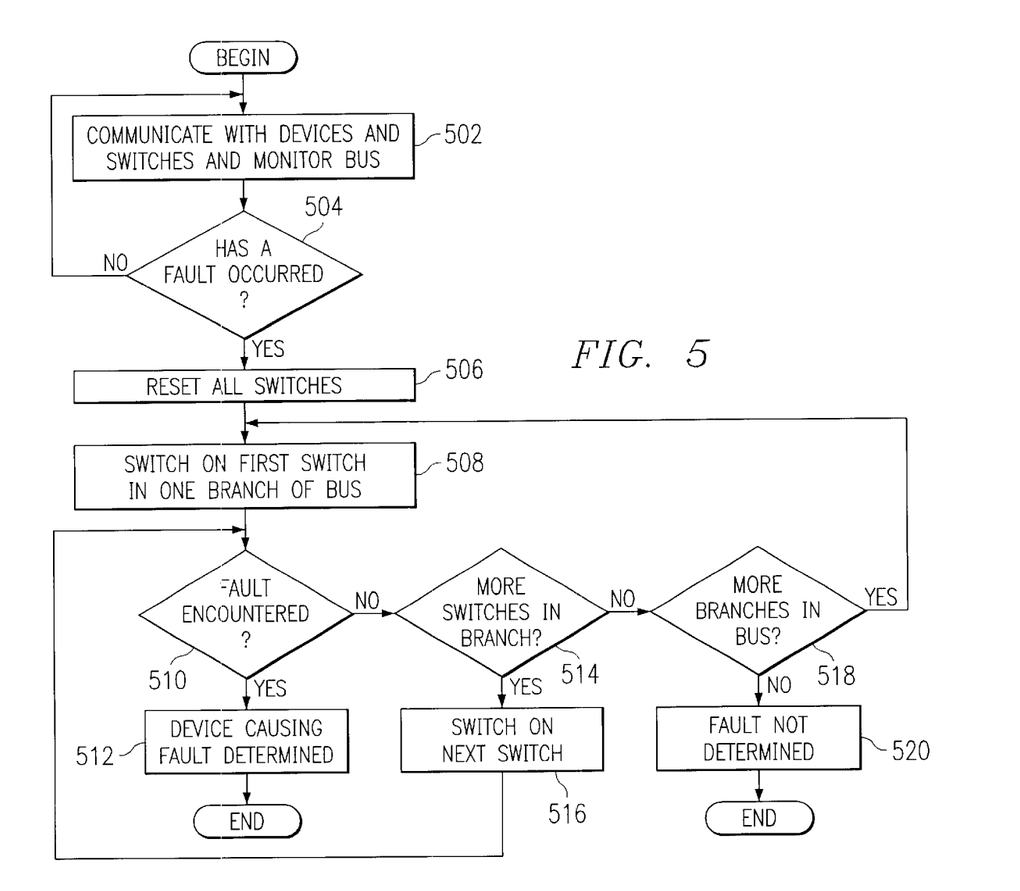
FIG. 5 depicts a flowchart illustrating an exemplary process for determining which device connected to an $I^2C$ bus has caused a fault in accordance with the present invention.

With reference now to FIG. 5, a flowchart illustrating an exemplary process for determining which device connected to an I²C bus has caused a fault is depicted in accordance with the present invention. The bus driver, such as, for example, bus driver 300 in FIG. 3, communicates with each device and switch connected to the bus driver through the I2C bus and monitors the I2C bus for the occurrence of faults (step 502). During the monitoring of the I2C bus, the bus driver determines whether a fault has occurred (step 504). If no fault has occurred, the bus driver continues communicating with each device and continues to monitor the bus for faults (step 502).

If a fault occurs, the bus driver resets all the switches within the bus (step 506) through the assertion of a reset signal. Resetting each switch constitutes opening (i.e. turning off each switch) such that no signals are passed through the switch. The bus driver then closes (i.e. turns on) the first switch of one branch of the bus (or the only branch if the bus is not forked) (step 508). If the bus is branched as depicted in FIG. 3, each switch in the lower fork has one address and each switch in the upper fork has a different address. The bus driver commands, for example, that switch 303 and switch 304 turn on their switches since both are addressed using the same address. However, since switch 303 is turned off, only switch 303 receives the command.

Once the first switch has been turned on, the bus driver determines whether a fault has occurred (step 510). If a fault has occurred, then the bus driver has determined the device causing the fault (step 512) to be either on the device connected to the switch newly turned on, the switch itself, or on the bus connectors just switched in. Therefore, eliminating numerous other potential causes of the bus fault. This information may then be presented to a user so that appropriate action may be taken.

If a fault is not encountered, then the bus driver determines if there are more switches within the branch of the bus being investigated (step 514). If there or more switches within the branch, then the next switch within that branch is closed (i.e. turned on) (step 516) and the bus driver determines if a fault has now been encountered (step 510). Again, if a fault is determined then the fault must be caused by either the newly turned on switch, the device or devices connected to the newly turned on switch, or the bus connectors just switched in. Any previous upstream switches, devices, or bus connectors cannot be the source of the fault if no fault appeared until the newly turned on switch was turned on.

If there are no more switches within the branch of the bus to investigate, then the bus driver determines whether there are more branches within the bus that need to be investigated. If there are more branches, then the first switch in the next branch is switched on (step 508) and the process continues from there in the manner as described above. If there are no more branches in the bus, then the bus driver has failed to locate the source of the fault (step 520).

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of determining the source of a fault within a bus, the method comprising:

monitoring a bus;

dividing the bus into a plurality of serial segments using a plurality of bus switching devices by separating each segment of the bus from a next segment in a serial order using one of said plurality of bus switching devices, each one of said plurality of serial segments being preceded in said serial order by one of said plurality of bus switching devices;

each one of said plurality of serial segments and all devices which may be coupled to each one of said plurality of serial segments being isolated from said bus using one of said plurality of bus switching devices which precedes each one of said plurality of serial segments when said one of said plurality of bus switching devices is turned off;

each one of said plurality of bus switching devices being capable of physically connecting or disconnecting all devices and all bus segments that are downstream in said serial order from said one of said plurality of bus switching devices;

responsive to determining that a fault has occurred on the bus, resetting each switch included in each one of said plurality of bus switching devices on the bus;

turning on a first switch included in a first one of said plurality of bus switching devices connected to a bus driver; and determining whether the fault is encountered.

2. The method as recited in claim 1, further comprising:

responsive to determining that the fault is encountered again, identifying the source of the fault as one of the first switch, one or more devices that were physically connected to the bus by the turning on of the first switch, and one ore more bus segments that were physically connected to the bus by the turning on of the first switch.

3. The method as recited in claim 2, further comprising:

presenting the source of the fault to a user.

4. The method as recited in claim 1, further comprising:

responsive to a determination that the fault is not encountered after turning on the first switch, turning on a second switch included in a second one of said plurality of bus switching devices, said second one of said plurality of bus switching devices being a next bus switching device in said serial order; and determining whether the fault is encountered.

5. The method as recited in claim 4, further comprising:

responsive to determining that the fault is encountered again, identifying the source of the fault as one of the second switch, one or more devices that were physically connected to the bus by the turning on of the second switch, and one or more bus segments that were physically connected to the bus by the turning on of the second switch.

6. The method as recited in claim 1, wherein the bus includes a first branch including a first plurality of said plurality of bus switching devices and a second branch that includes a second plurality of said plurality of bus switching devices and wherein the first switch is a first switch in said first branch of the bus and further comprising:

responsive to a determination that the fault is not encountered after turning on any of the switches in the first plurality of said plurality of bus switching devices in the first branch of the bus, turning on a first switch in a second one of said second plurality of said plurality of bus switching devices in said second branch of the bus; and determining whether the fault is encountered.

7. The method as recited in claim 1, wherein the bus is an inter integrated circuit bus.

8. The method as recited in claim 1, further comprising:

resetting each switch in each one of said plurality of bus switching devices utilizing a reset signal that is received by each one of said plurality of bus switching devices which turns off each switch in each one of said plurality of bus switching devices, said reset signal being independent of said bus, each one of said plurality of segments being physically disconnected from said bus in response to each switch being reset.

9. A computer program product in a computer readable media for use in a data processing system for determining the source of a fault within a bus, the computer program product comprising:

instructions for monitoring a bus;

the bus being divided into a plurality of serial segments using a plurality of bus switching devices by separating each segment of the bus from a next segment in a serial order using one of said plurality of bus switching devices, each one of said plurality of serial segments being preceded in said serial order by one of said plurality of bus switching devices;

each one of said plurality of serial segments and all devices which may be coupled to each one of said plurality of serial segments being isolated from said bus using one of said plurality of bus switching devices which precedes each one of said plurality of serial segments when said one of said plurality of bus switching devices is turned off;

each one of said plurality of bus switching devices being capable of physically connecting or disconnecting all devices and all bus segments that are downstream in said serial order from said one of said plurality of bus switching devices;

instructions, responsive to determining that a fault has occurred on the bus, for resetting each switch included in each one of said plurality of switching devices on the bus;

instructions for turning on a first switch included in a first one of said plurality of switching devices connected to a bus driver; and instructions for determining whether the fault is encountered.

10. The computer program product as recited in claim 9, further comprising:
   instructions, responsive to determining that the fault is encountered, for identifying the source of the fault as one of the first switch, or one or more devices that were physically connected to the bus by the turning on of the first switch, and one or more bus segments that were physically connected to the bus by the turning on of the first switch.

11. The computer program product as recited in claim 10, further comprising:
   instructions for presenting the source of the fault to a user.

12. The computer program product as recited in claim 9, further comprising:
   instructions, responsive to a determination that the fault is not encountered after turning on the first switch, for turning on a second switch included in a second one of said plurality of bus switching devices, said second one of said plurality of bus switching devices being a next bus switching device in said serial order; and
   instructions for determining whether the fault is encountered.

13. The computer program product as recited in claim 12, further comprising:
   instructions, responsive to determining that the fault is encountered, for identifying the source of the fault as one of the second switch, one or more devices that were physically connected to the bus by the turning on of the second switch, and one or more bus segments that were physically connected to the bus by the turning on of the second switch.

14. The computer program product as recited in claim 9, wherein the bus includes a first branch including a first plurality of said plurality of bus switching devices and a second branch that includes a second plurality of said plurality of bus switching devices and wherein the first switch is a first switch in said first branch of the bus and further comprising:
   instructions, responsive to a determination that the fault is not encountered after turning on any of the switches in the first plurality of said plurality of bus switching devices in the first branch of the bus, for turning on a first switch in a second one of said second plurality of said plurality of bus switching devices in said second branch of the bus; and
   instructions for determining whether the fault is encountered.

15. The computer program product as recited in claim 9, wherein the bus is an inter integrated circuit bus.

16. The computer program product as recited in claim 9, further comprising resetting each switch in said plurality of bus switching devices utilizing a reset signal that is received by each one of said plurality of bus switching devices which turns off each switch in each one of said plurality of bus switching devices, said reset signal being independent of said bus, each one of said plurality of segments being physically disconnected from said bus in response to each switch being reset.

17. A system of determining the source of a fault within a bus, the system comprising:
   a fault monitor which monitors a bus;
   a plurality of bus switching devices for dividing the bus into a plurality of serial segments using said plurality of bus switching devices by separating each segment of the bus from a next segment in a serial order using one of said plurality of bus switching devices, each one of said plurality of serial segments being preceded in said serial order by one of said plurality of bus switching devices;
   each one of said plurality of serial segments and all devices which may be coupled to each one of said plurality of serial segments being isolated from said bus using one of said plurality of bus switching devices which precedes each one of said plurality of serial segments when said one of said plurality of bus switching devices is turned off;
   each one of said plurality of bus switching devices being capable of physically connecting or disconnecting all devices and all bus segments that are downstream in said serial order from said one of said plurality of bus switching devices;
   a switch resetter which, responsive to a determination that a fault has occurred on the bus, which resets each switch included in each one of said plurality of switching devices on the bus;
   a fault isolator which turns on a first switch included in a first one of said plurality of switching devices connected to a bus driver; and
   a fault determination unit which determines whether the fault is encountered.

18. The system as recited in claim 17, further comprising:
   a fault locator which, responsive to determining that the fault is encountered, identifies the source of the fault as one of the first switch, one or more devices that were physically connected to the bus by the turning of the first switch, and one or more bus segments that were physically connected to the bus by the turning on the first switch.

19. The system as recited in claim 18, further comprising:
   a presentation unit which presents the source of the fault to a user.

20. The system as recited in claim 17, wherein:
   the fault isolator; responsive to a determination that the fault is not encountered after turning on the first switch, turns on a second switch included in a second one of said plurality of bus switching devices, said second one of said plurality of bus switching devices being a next bus switching device in said serial order; and
   the fault determination unit determines whether the fault is encountered.

21. The system as recited in claim 20, wherein the fault locator, responsive to determining that the fault is encountered after turning on the second switch, identifies the source of the fault as one of the second switch, one or more devices that were physically connected to the bus by the turning on of the second switch, and one or more bus segments that were physically connected to the bus by the turning on of the second switch.

22. The system as recited in claim 17, wherein the bus includes a first branch including a first plurality of said plurality of bus switching devices and a second branch that includes a second plurality of bus switching devices and wherein:
   the first switch is a first switch in said first branch of the bus;
   the fault isolator, responsive to a determination that the fault is not encountered after turning on any of the switches in the first plurality of said plurality of bus switching devices in the first branch of the bus, turns on a first switch in a second one of said second plurality of said plurality of bus switching devices in said second branch of the bus; and the fault determination unit determines whether the fault is encountered.

23. The system as recited in claim 17, wherein the bus is an inter integrated circuit bus.

24. The system as recited in claim 17, further comprising a reset signal for resetting each switch in said plurality of bus switching devices utilizing the reset signal that is received by each one of said plurality of bus switching devices which turns off each switch in each one of said plurality of bus switching devices, said reset signal being independent of said bus, each one of said plurality of segments being physically disconnected from said bus in response to each switch being reset.

* * * * *

UNITED STATES PATENT AND TRADEMARK OFFICE
CERTIFICATE OF CORRECTION

PATENT NO. : 6,769,078 B2
DATED : July 27, 2004
INVENTOR(S) : Barenys et al.

It is certified that error appears in the above-identified patent and that said Letters Patent is hereby corrected as shown below:

Title page,
Item [57], ABSTRACT,
Line 1, after "method" insert -- , -- (comma).

Column 10,
Line 31, after "turning" insert -- on --.
Line 39, after "isolator" delete ";" insert -- , -- (comma).

Signed and Sealed this

Twenty-fifth Day of October, 2005

JON W. DUDAS
*Director of the United States Patent and Trademark Office*